United States Patent
Monnin

[11] Patent Number: 6,071,061
[45] Date of Patent: Jun. 6, 2000

[54] MULTI-PURPOSE HAND CART

[76] Inventor: Tom Monnin, 6500 W. 26th St., Sioux Falls, S. Dak. 57106

[21] Appl. No.: 09/228,882

[22] Filed: Jan. 12, 1999

[51] Int. Cl.$^7$ ........................................................ B62B 1/06
[52] U.S. Cl. .......................... 414/457; 414/444; 414/910; 414/911; 280/47.12; 280/47.24; 298/5; 242/597
[58] Field of Search .................... 414/458, 459, 414/460, 461, 490, 444, 457, 421, 910, 911; 280/47.12, 47.24; 298/5; 254/2 R, 3 R, 8 R, 94, 131, 133 R, 120; 242/594.1, 591

[56] References Cited

U.S. PATENT DOCUMENTS

| | | |
|---|---|---|
| D. 330,958 | 11/1992 | Verbeck . |
| D. 330,960 | 11/1992 | Roberson . |
| D. 395,120 | 6/1998 | Newman et al. . |
| 399,621 | 3/1889 | Leahy ...................................... 414/421 |
| 517,642 | 4/1894 | Campbell ................................. 414/457 |
| 1,102,872 | 7/1914 | Cerney et al. .......................... 414/457 |
| 1,255,484 | 2/1918 | Stephens ................................. 414/457 |
| 1,278,272 | 9/1918 | Wilson . |
| 1,587,842 | 6/1926 | Knox . |
| 1,985,362 | 12/1934 | Clyde . |
| 2,414,946 | 1/1947 | Hammermiller . |
| 2,736,569 | 2/1956 | Davis . |
| 4,240,773 | 12/1980 | Terry . |
| 4,566,708 | 1/1986 | Spencie ................................ 280/47.13 |
| 4,705,283 | 11/1987 | Kleisath . |
| 4,802,709 | 2/1989 | Jones .................................. 414/421 X |
| 4,824,313 | 4/1989 | Miller . |
| 5,253,972 | 10/1993 | Drew et al. . |
| 5,328,192 | 7/1994 | Thompson . |
| 5,580,073 | 12/1996 | Irwin et al. . |

FOREIGN PATENT DOCUMENTS

| | | | |
|---|---|---|---|
| 1031238 | 6/1953 | France | ..................................... 414/457 |
| 1075786 | 10/1954 | France | ..................................... 414/457 |

*Primary Examiner*—Frank E. Werner

[57] ABSTRACT

A multi-purpose hand cart for permitting a single user to transport a variety of heavy loads. The multi-purpose hand cart includes a rear base frame having a spaced apart pair of side members and an elongate rear cross member connecting the side members of the rear base frame together. A pair of wheel assemblies each having a rear member and a wheel rotatably mounted to the rear member of the respective wheel assembly. The back end of a first of the side members of the rear base frame is coupled to the front end of the rear member of a first of the wheel assemblies. The back end of a second of the side members of the rear base frame is coupled to the front end of the rear member of a second of the wheel assemblies. A pair of front members are also provided. The back end of a first of the front members is coupled to the front end of the first side member of the rear base frame. The back end of a second of the front members is coupled to the front end of the second side member of the rear base frame. A lifting frame is provided having a spaced apart pair of arms and an upper handle connecting the arms together. The front end of the first front member is coupled to the lower end of a first of the arms of the lifting frame. The front end of the second front member is coupled to the lower end of a second of the arms of the lifting frame. Each of the wheel assemblies has a roll receiver upwardly extending therefrom. Each of the roll receivers comprises a strut upwardly extending from the respective wheel assembly and a generally U-shaped cradle adjacent an upper end of the respective strut.

12 Claims, 4 Drawing Sheets

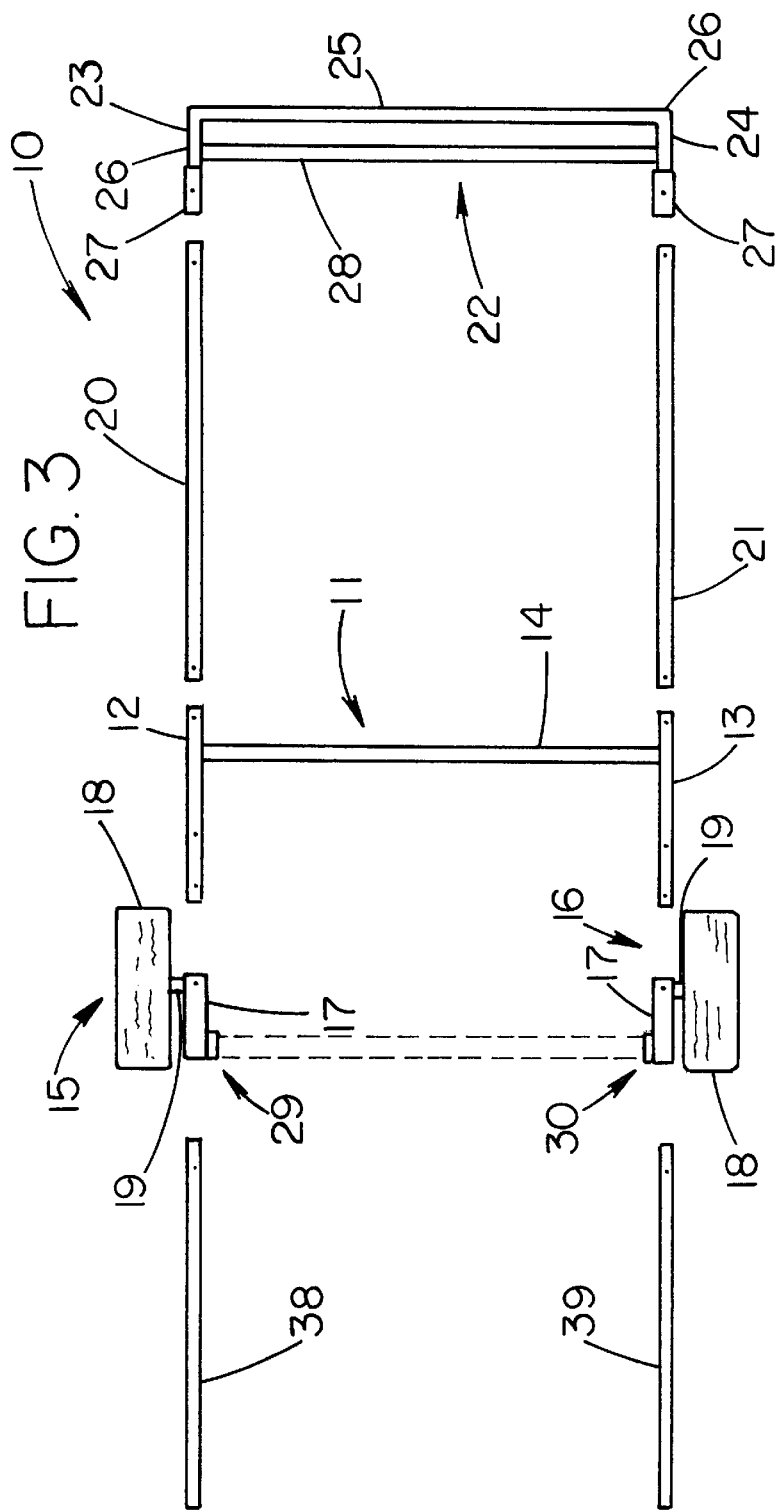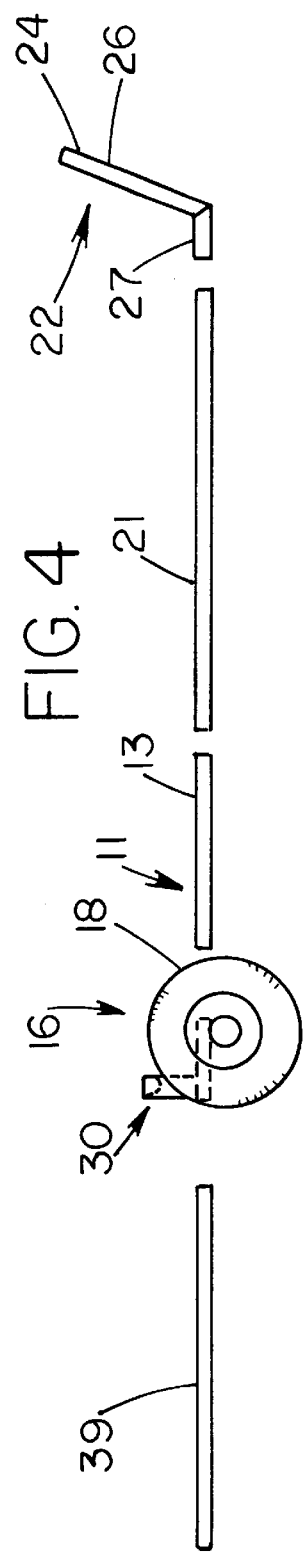

MULTI-PURPOSE HAND CART

BACKGROUND OF THE INVENTION

1. Field of the Invention

The present invention relates to hand carts and more particularly pertains to a new multi-purpose hand cart for permitting a single user to transport a variety of heavy loads.

2. Description of the Prior Art

The use of hand carts is known in the prior art. More specifically, hand carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,824,313 by Miller; U.S. Pat. No. 5,328,192 by Thompson; U.S. Pat. No. 4,705,283 by Kleisath; U.S. Pat. No. 1,278,272 by Wilson; U.S. Pat. No. 4,240,773 by Terry; U.S. Pat. No. 1,587,842 by Knox; U.S. Pat. No. 5,253,972 by Drew et al.; U.S. Pat. No. 2,736,569 by Davis; U.S. Pat. No. 5,580,073 by Irwin et al.; U.S. Pat. No. 2,414,946 by Hammermiller; U.S. Pat. No. 1,958,362 by Clyde; U.S. Pat. No. Des. 330,960 by Robertson; U.S. Pat. No. Des. 395,120 by Newman et al.; and U.S. Pat. No. Des. 330,958 by Verbeck.

While these devices fulfill their respective, particular objectives and requirements, the aforementioned patents do not disclose a new multi-purpose hand cart. The inventive device includes a rear base frame having a spaced apart pair of side members and an elongate rear cross member connecting the side members of the rear base frame together. A pair of wheel assemblies each having a rear member and a wheel rotatably mounted to the rear member of the respective wheel assembly. The back end of a first of the side members of the rear base frame is coupled to the front end of the rear member of a first of the wheel assemblies. The back end of a second of the side members of the rear base frame is coupled to the front end of the rear member of a second of the wheel assemblies. A pair of front members are also provided. The back end of a first of the front members is coupled to the front end of the first side member of the rear base frame. The back end of a second of the front members is coupled to the front end of the second side member of the rear base frame. A lifting frame is provided having a spaced apart pair of arms and an upper handle connecting the arms together. The front end of the first front member is coupled to the lower end of a first of the arms of the lifting frame. The front end of the second front member is coupled to the lower end of a second of the arms of the lifting frame. Each of the wheel assemblies has a roll receiver upwardly extending therefrom. Each of the roll receivers comprises a strut upwardly extending from the respective wheel assembly and a generally U-shaped cradle adjacent an upper end of the respective strut.

In these respects, the multi-purpose hand cart according to the present invention substantially departs from the conventional concepts and designs of the prior art, and in so doing provides an apparatus primarily developed for the purpose of permitting a single user to transport a variety of heavy loads.

SUMMARY OF THE INVENTION

In view of the foregoing disadvantages inherent in the known types of hand carts now present in the prior art, the present invention provides a new multi-purpose hand cart construction wherein the same can be utilized for permitting a single user to transport a variety of heavy loads.

The general purpose of the present invention, which will be described subsequently in greater detail, is to provide a new multi-purpose hand cart apparatus and method which has many of the advantages of the hand carts mentioned heretofore and many novel features that result in a new multi-purpose hand cart which is not anticipated, rendered obvious, suggested, or even implied by any of the prior art hand carts, either alone or in any combination thereof.

To attain this, the present invention generally comprises a rear base frame having a spaced apart pair of side members and an elongate rear cross member connecting the side members of the rear base frame together. A pair of wheel assemblies each having a rear member and a wheel rotatably mounted to the rear member of the respective wheel assembly. The back end of a first of the side members of the rear base frame is coupled to the front end of the rear member of a first of the wheel assemblies. The back end of a second of the side members of the rear base frame is coupled to the front end of the rear member of a second of the wheel assemblies. A pair of front members are also provided. The back end of a first of the front members is coupled to the front end of the first side member of the rear base frame. The back end of a second of the front members is coupled to the front end of the second side member of the rear base frame. A lifting frame is provided having a spaced apart pair of arms and an upper handle connecting the arms together. The front end of the first front member is coupled to the lower end of a first of the arms of the lifting frame. The front end of the second front member is coupled to the lower end of a second of the arms of the lifting frame. Each of the wheel assemblies has a roll receiver upwardly extending therefrom. Each of the roll receivers comprises a strut upwardly extending from the respective wheel assembly and a generally U-shaped cradle adjacent an upper end of the respective strut.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-purpose hand cart apparatus and method which has many of the advantages of the hand carts mentioned heretofore and many novel features that result in a new multi-purpose hand cart which is not anticipated, rendered obvious, suggested, or even implied by any of the prior art hand carts, either alone or in any combination thereof.

It is another object of the present invention to provide a new multi-purpose hand cart which may be easily and efficiently manufactured and marketed.

It is a further object of the present invention to provide a new multi-purpose hand cart which is of a durable and reliable construction.

An even further object of the present invention is to provide a new multi-purpose hand cart which is susceptible of a low cost of manufacture with regard to both materials and labor, and which accordingly is then susceptible of low prices of sale to the consuming public, thereby making such multi-purpose hand cart economically available to the buying public.

Still yet another object of the present invention is to provide a new multi-purpose hand cart which provides in the apparatuses and methods of the prior art some of the advantages thereof, while simultaneously overcoming some of the disadvantages normally associated therewith.

Still another object of the present invention is to provide a new multi-purpose hand cart for permitting a single user to transport a variety of heavy loads.

Yet another object of the present invention is to provide a new multi-purpose hand cart which includes a rear base frame having a spaced apart pair of side members and an elongate rear cross member connecting the side members of the rear base frame together. A pair of wheel assemblies each having a rear member and a wheel rotatably mounted to the rear member of the respective heel assembly. The back end of a first of the side members of the rear base frame is coupled to the front end of the rear member of a first of the wheel assemblies. The back end of a second of the side members of the rear base frame is coupled to the front end of the rear member of a second of the wheel assemblies. A pair of front members are also provided. The back end of a first of the front members is coupled to the front end of the first side member of the rear base frame. The back end of a second of the front members is coupled to the front end of the second side member of the rear base frame. A lifting frame is provided having a spaced apart pair of arms and an upper handle connecting the arms together. The front end of the first front member is coupled to the lower end of a first of the arms of the lifting frame. The front end of the second front member is coupled to the lower end of a second of the arms of the lifting frame. Each of the wheel assemblies has a roll receiver upwardly extending therefrom. Each of the roll receivers comprises a strut upwardly extending from the respective wheel assembly and a generally U-shaped cradle adjacent an upper end of the respective strut.

Still yet another object of the present invention is to provide a new multi-purpose hand cart that lets a single user move a heavy roll easily, and also carry heavy pallets of insulation easily.

Even still another object of the present invention is to provide a new multi-purpose hand cart that has oversized rubber pneumatic tires so that the hand cart may traverse delicate surfaces, such as an unfinished roof surface, without damaging the surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic explode top plan view of the present invention.

FIG. 4 is a schematic explode side view of the present invention.

DESCRIPTION OF THE PREFERRED EMBODIMENT

Figure 1:
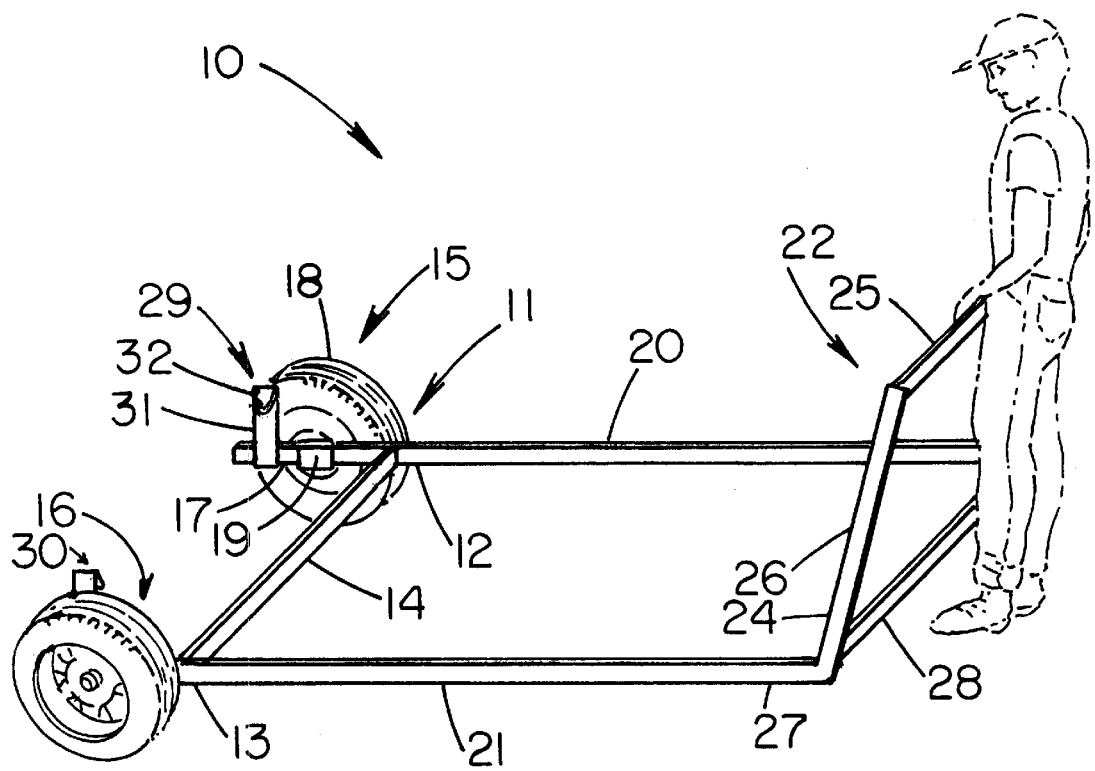
FIG. 1 is a schematic perspective view of a new multi-purpose hand cart according to the present invention.

With reference now to the drawings, and in particular to FIGS. 1 through 8 thereof, a new multi-purpose hand cart embodying the principles and concepts of the present invention and generally designated by the reference numeral 10 will be described.

As best illustrated in FIGS. 1 through 8, the multi-purpose hand cart 10 generally comprises a rear base frame having a spaced apart pair of side members and an elongate rear cross member connecting the side members of the rear base frame together. A pair of wheel assemblies each having a rear member and a wheel rotatably mounted to the rear member of the respective wheel assembly. The back end of a first of the side members of the rear base frame is coupled to the front end of the rear member of a first of the wheel assemblies. The back end of a second of the side members of the rear base frame is coupled to the front end of the rear member of a second of the wheel assemblies. A pair of front members are also provided. The back end of a first of the front members is coupled to the front end of the first side member of the rear base frame. The back end of a second of the front members is coupled to the front end of the second side member of the rear base frame. A lifting frame is provided having a spaced apart pair of arms and an upper handle connecting the arms together. The front end of the first front member is coupled to the lower end of a first of the arms of the lifting frame. The front end of the second front member is coupled to the lower end of a second of the arms of the lifting frame. Each of the wheel assemblies has a roll receiver upwardly extending therefrom. Each of the roll receivers comprises a strut upwardly extending from the respective wheel assembly and a generally U-shaped cradle adjacent an upper end of the respective strut.

In closer detail, the multi-purpose hand cart 10 comprises a rear base frame 11 having a spaced apart pair of elongate tubular side members 12,13 and an elongate tubular rear cross member 14 connecting the side members of the rear base frame together. The side members of the rear base frame are extended substantially parallel to one another and substantially perpendicular to the rear cross member of the rear base frame. The side members of the rear base frame each have opposite open front and back ends. The rear cross member is positioned closer towards the front ends of the side members than to the back ends of the side members of the rear base frame. In an ideal illustrative embodiment, the side members of the rear base frame each have a length defined between the front and back ends of the respective side member of about 28 inches. In this ideal illustrative embodiment, the rear cross member of the rear base frame has a length defined between the side members of the rear base frame of about 72½ inches.

A pair of wheel assemblies 15,16 are provided each comprising a tubular rear member 17 and a wheel 18 rotatably mounted to an axle 19 outwardly extending from the tubular rear member of the respective wheel assembly. Each rear member has open front and back ends. The back end of a first of the side members of the rear base frame is inserted into the front end of the rear member of a first of the wheel assemblies to detachably couple the back end of the first side member of the rear base frame to the front end of the rear member of the first wheel assembly. The back end of a second of the side members of the rear base frame is inserted into the front end of the rear member of a second of the wheel assemblies to detachably couple the back end of the second side member of the rear base frame to the front end of the rear member of the second wheel assembly. The rear members of the wheel assemblies are extended substantially parallel to one another so that the rear members of the wheel assemblies are extended generally collinear with their associated side member of the rear base frame. The rear members of the wheel assemblies are also positioned between the wheels of the wheel assemblies. Each of the wheels of the wheel assemblies comprises a resiliently deformable rubber pneumatic tire.

A pair of elongate tubular front members 20,21 are provided each having opposite open front and back ends. The back end of a first of the front members is inserted into the front end of the first side member of the rear base frame to detachably couple the back end of the first front member to the front end of the first side member. Similarly, the back end of a second of the front members is inserted into the front end of the second side member of the rear base frame to detachably couple the back end of the second front member to the front end of the second side member. The front members are preferably extended substantially parallel to one another so that the front members each are generally collinear with their associated side member of the rear base frame. In an ideal illustrative embodiment, the front members each have a length defined between the front and back ends of the respective front member of about 66 inches.

A lifting frame 22 is provided comprising a spaced apart pair of tubular arms 23,24 and an elongate tubular upper handle 25 connecting the arms together. Preferably, the arms lie in substantially parallel planes with the upper handle extending substantially perpendicular to the planes of the arms of the lifting frame. Preferably, each of the arms of the lifting frame is generally L-shaped and has elongate upper and lower portions 26,27. The upper portion of each arm terminates at an upper end of the respective arm while the lower portion of each arm terminates at an open lower end of the respective arm. The upper handle of the lifting frame is positioned adjacent the upper ends of the arms of the lifting frame. The upper portion of each arm is extended at an obtuse angle with respect to the associated lower portion of the respective arm. Preferably, the obtuse angle is between about 95 degrees and about 135 degrees. Ideally, the obtuse angle is about 108 degrees. In an ideal illustrative embodiment, the upper portion of each arm has a length defined between the upper end of the respective arm and the associated lower portion of the respective arm of about 24 inches and the lower portion of each arm has a length defined between the lower end of the respective arm and the associated upper portion of the respective arm of about 4¾ inches.

The front end of the first front member is inserted into the lower end of a first of the arms of the lifting frame while the front end of the second front member is inserted into the lower end of a second of the arms of the lifting frame to couple the front ends of the front members to the lifting frame. Preferably, the lifting frame further comprises an elongate lower handle 28 extending between the upper portions of the arms adjacent the lower portions of the arms. Ideally, the upper and lower handles of the lifting frame is extended substantially parallel to one another.

Each of the wheel assemblies has a roll receiver 29,30 upwardly extending therefrom. The roll receivers are each positioned adjacent the back end of the respective rear member such that the roll receivers are positioned between the back end of the respective rear member and the axle of the associated wheel assembly.

Figure 2:
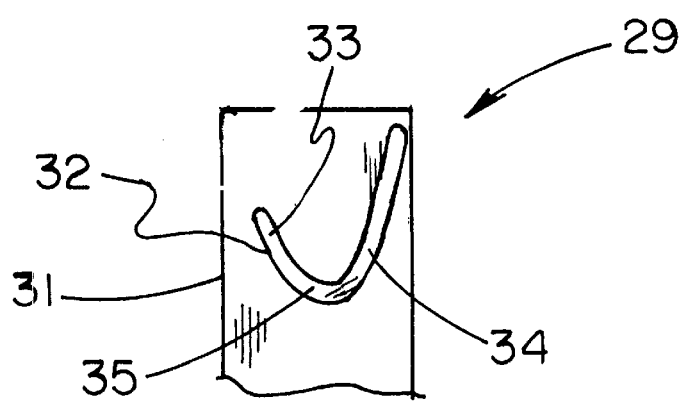
FIG. 2 is a schematic enlarged side view of a cradle of the present invention.

Each of the roll receivers comprises a strut 31 upwardly extending from the respective wheel assembly and a generally U-shaped cradle 32 adjacent an upper end of the respective strut. The cradles of the roll receivers face inwards towards one another. As illustrated in FIG. 2, the cradles each have a spaced apart pair of generally straight side portions 33,34 and an arcuate lower portion 35 connecting the side portions of the respective cradle together. The side portions of each cradle are extended at an acute angle to one another.

Figure 5:
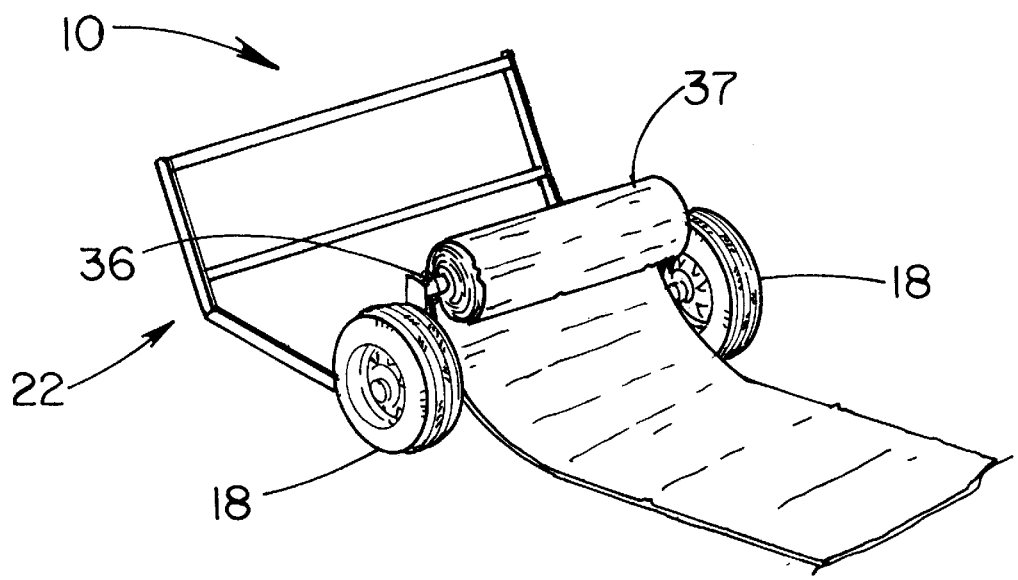
FIG. 5 is a schematic perspective view of the present invention in use with a roll resting on the roll receivers.

In use, the cradles are each designed for resting an end of a generally cylindrical tube 36 extended through a roll 37 such that the roll is carried on the cradles as illustrated in FIG. 5. To pick up a roll lying on the ground, the upper handle of the hand cart is lifted upwards to pivot the hand cart at the wheels so that the lower side portions of the cradles become extended horizontally. The hand cart is then rolled towards the roll so that the ends of the tube extending through the roll are received by the cradles. The upper handle may then be pulled downwards to pivot the roll receivers upwards and thereby lift the roll onto the roll receivers to be carried by the hand cart. These steps are reversed to remove a roll from the roll receivers.

A pair of elongate tubular rear extensions 38,39 may also be provided each having open front and back ends. The front end of a first of the rear extension is inserted into the back end of the rear member of the first wheel assembly to detachably couple the front end of the first rear extension of the back end of the rear member of the first wheel assembly. Similarly, the front end of a second of the rear extension is inserted into the back end of the rear member of the second wheel assembly to detachably couple the front end of the second rear extension of the back end of the rear member of the second wheel assembly. The rear extensions are preferably extended substantially parallel to one another and substantially collinear with their associated rear member. In an ideal illustrative embodiment, the rear extension each have a length defined between the front and back ends of the respective rear extension of about 55 inches.

Figure 6:
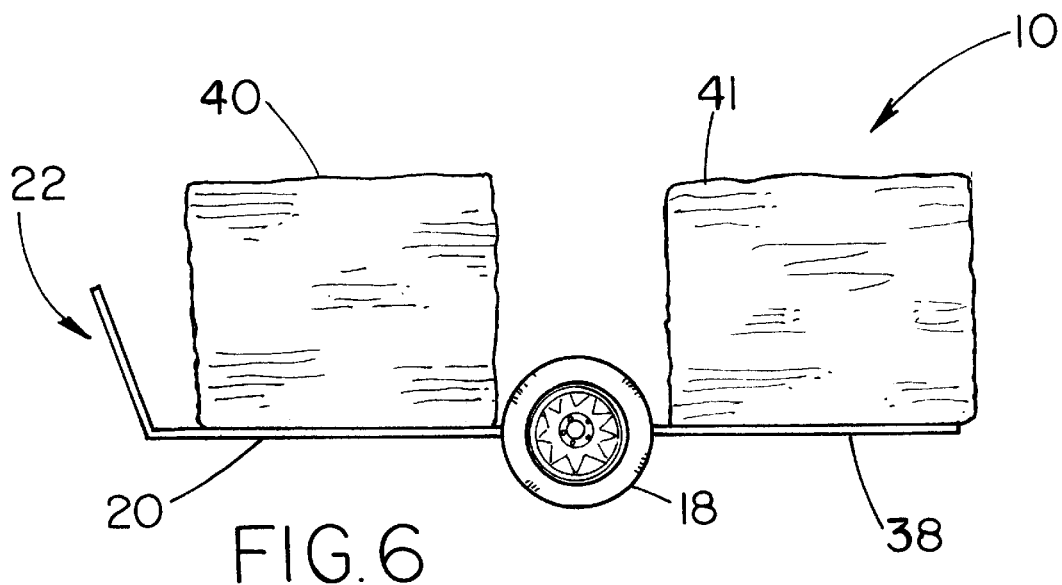
FIG. 6 is a schematic side view of the present invention with rear extensions attached and with two pallets resting thereon.

In use, as illustrated in FIG. 6, the rear extension and the front members each may be used to rest two pallets 40,41 thereon with one pallet on the front members and another pallet on the rear extensions. This way, the wheels are located between the pallets to help balance the hand cart when carrying this type of load.

Ideally, all the members that are inserted into other members each have a pin extending therethrough to releasably hold the inserted members in their receiving members to permit quick assembly and disassembly of the hand cart.

Optionally, the rear cross member 14, the upper handle 25, and the lower handle 28 may ideally all be adjustably extendable to permit a user to selectively widen or narrow the width of the hand cart (defined between the front members 20,21) to accommodate various lengths of rolls between the roll receivers 29,30.

Figure 7:
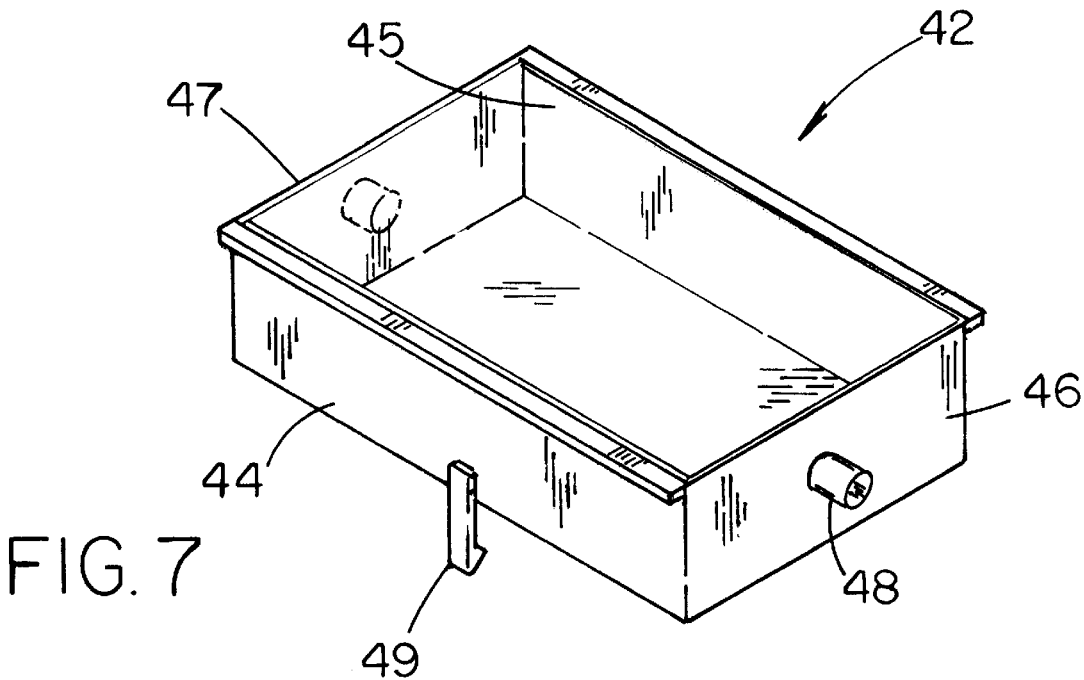
FIG. 7 is a schematic perspective view of the box accessory of the present invention.
Figure 8:
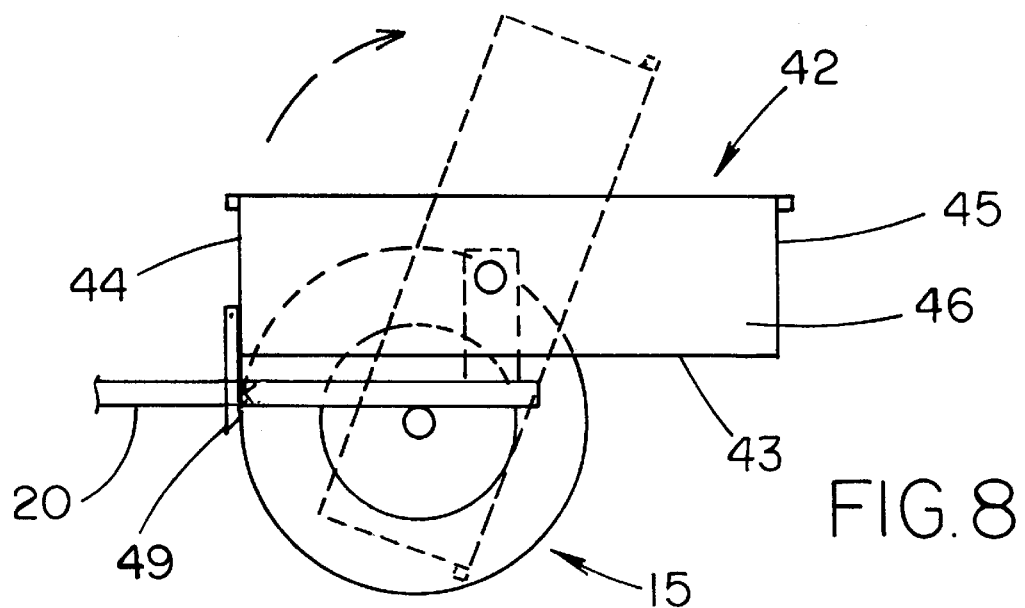
FIG. 8 is a schematic side view of the box accessory attached to the present invention and illustrating the pivoting of the box to dump a load carried therein.

FIGS. 7 and 8 illustrate another accessory included in a preferred embodiment of the hand cart. This accessory comprises a generally rectangular box 42 having a bottom 43, a front 44, a back 45, a pair of sides 46,47, and an open top. The box is designed for carrying a load therein. Each of the sides of the box has a stub 48 outwardly extending therefrom. As illustrated in FIG. 8, the box is positioned between the roll receivers with one of the stubs of the box resting on the cradle of one roll receiver and the other of the stubs resting on the cradle of the other roll receiver to carry the box on the handcart. As illustrated in FIG. 8, the box is pivotable on the cradles to permit dumping of the load is carried by the box. Preferably, a latch 49 is coupled to the front of the box to releasably engage the rear cross member to releasably hold the box against pivoting when resting on the cradles. In the ideal illustrative embodiment, the box has a height defined between the top and bottom of the box of about 12 inches, a width defined between the sides of the box of about 66 inches, and a depth defined between the front and back of the box of about 40½ inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A hand cart, comprising:

a rear base frame comprising a spaced apart pair of side members and an elongate rear cross member connecting said side members of said rear base frame together;

said side members of said rear base frame each having opposite open front and back ends;

a pair of wheel assemblies each comprising a rear member and a wheel rotatably mounted to said rear member of the respective wheel assembly;

each of said rear members having front and back ends;

said back end of a first of said side members of said rear base frame being coupled to said front end of said rear member of a first of said wheel assemblies, said back end of a second of said side members of said rear base frame being coupled to said front end of said rear member of a second of said wheel assemblies;

a pair of front members each having front and back ends;

said back end of a first of said front members being coupled to said front end of said first side member of said rear base frame, said back end of a second of said front members being coupled to said front end of said second side member of said rear base frame;

a lifting frame comprising a spaced apart pair of arms and an upper handle connecting said arms together;

each of said arms of said lifting frame being generally L-shaped and having elongate upper and lower portions, said upper portion of each arm terminating at an upper end of the respective arm, said lower portion of each arm terminating at a lower end of the respective arm;

said front end of said first front member being coupled to said lower end of a first of said arms of said lifting frame, said front end of said second front member being coupled to said lower end of a second of said arms of said lifting frame;

each of said wheel assemblies having a roll receiver upwardly extending therefrom, said roll receivers each being positioned adjacent said back end of the respective rear member; and each of said roll receivers comprising a strut upwardly extending from the respective wheel assembly and a generally U-shaped cradle adjacent an upper end of the respective strut.

2. The hand cart of claim 1, wherein said rear cross member is positioned closer towards said front ends of said side members than to said back ends of said side members of said rear base frame.

3. The hand cart of claim 1, wherein said rear members of said wheel assemblies are positioned between said wheels of said wheel assemblies.

4. The hand cart of claim 1, wherein said upper handle of said lifting frame is positioned adjacent said upper ends of said arms of said lifting frame.

5. The hand cart of claim 1, wherein said upper portion of each arm is extended at an obtuse angle with respect to the associated lower portion of the respective arm.

6. The hand cart of claim 1, wherein said lifting frame further comprises an elongate lower handle extending between said upper portions of said arms adjacent said lower portions of said arms, said upper and lower handles of said lifting frame being extended substantially parallel to one another.

7. The hand cart of claim 1, wherein said cradles each have a spaced apart pair of generally straight side portions and an arcuate lower portion connecting said side portions of the respective cradle together.

8. The hand cart of claim 7, wherein said side portions of each cradle are extended at an acute angle to one another.

9. The hand cart of claim 1, further comprising a pair of rear extensions each having front and back ends, said front end of a first of said rear extension being coupled to said back end of said rear member of said first wheel assembly, said front end of a second of said rear extension being coupled said back end of said rear member of said second wheel assembly.

10. The hand cart of claim 9, wherein said rear extensions are extended substantially parallel to one another.

11. The hand cart of claim 1, further comprising a generally rectangular box having a bottom, a front, a back, a pair of sides, and an open top, each of said sides of said box having a stub outwardly extending therefrom, said box being positioned between said roll receivers, one of said stubs of said box being rested on said cradle of one roll receiver, the other of said stubs being rested on said cradle of the other roll receiver.

12. A hand cart, comprising:
- a rear base frame comprising a spaced apart pair of elongate tubular side member and an elongate tubular rear cross member connecting said side members of said rear base frame together;
- side members of said rear base frame being extended substantially parallel to one another and substantially perpendicular to said rear cross member of said rear base frame;
- said side members of said rear base frame each having opposite open front and back ends, said rear cross member being positioned closer towards said front ends of said side members than to said back ends of said side members of said rear base frame;
- a pair of wheel assemblies each comprising a tubular rear member and a wheel rotatably mounted to an axle outwardly extending from said tubular rear member of the respective wheel assembly;
- each of said rear members having open front and back ends;
- said back end of a first of said side members of said rear base frame being inserted into said front end of said rear member of a first of said wheel assemblies to detachably couple said back end of said first side member of said rear base frame to said front end of said rear member of said first wheel assembly;
- said back end of a second of said side members of said rear base frame being inserted into said front end of said rear member of a second of said wheel assemblies to detachably couple said back end of said second side member of said rear base frame to said front end of said rear member of said second wheel assembly;
- said rear members of said wheel assemblies being extended substantially parallel to one another, said rear members of said wheel assemblies being extended generally collinear with the associated side member of said rear base frame;
- said rear members of said wheel assemblies being positioned between said wheels of said wheel assemblies;
- a pair of elongate tubular front members each having opposite open front and back ends;
- said back end of a first of said front members being inserted into said front end of said first side member of said rear base frame to detachably couple said back end of said first front member to said front end of said first side member;
- said back end of a second of said front members being inserted into said front end of said second side member of said rear base frame to detachably couple said back end of said second front member to said front end of said second side member;
- said front members being extended substantially parallel to one another, said front members each being generally collinear with the associated side member of said rear base frame;
- a lifting frame comprising a spaced apart pair of tubular arms and an elongate tubular upper handle connecting said arms together;
- said arms lying in substantially parallel planes, said upper handle being extended substantially perpendicular to said planes of said arms of said lifting frame;
- each of said arms of said lifting frame being generally L-shaped and having elongate upper and lower portions, said upper portion of each arm terminating at an upper end of the respective arm, said lower portion of each arm terminating at an open lower end of the respective arm;
- said upper handle of said lifting frame being positioned adjacent said upper ends of said arms of said lifting frame;
- said upper portion of each arm being extended at an obtuse angle with respect to the associated lower portion of the respective arm;
- said front end of said first front member being inserted into said lower end of a first of said arms of said lifting frame, said front end of said second front member being inserted into said lower end of a second of said arms of said lifting frame;
- said lifting frame further comprising an elongate lower handle extending between said upper portions of said arms adjacent said lower portions of said arms, said upper and lower handles of said lifting frame being extended substantially parallel to one another;
- each of said wheel assemblies having a roll receiver upwardly extending therefrom, said roll receivers each being positioned adjacent said back end of the respective rear member such that the roll receivers are each positioned between the back end of the respective rear member and the axle of the associated wheel assembly;
- each of said roll receivers comprising a strut upwardly extending from the respective wheel assembly and a generally U-shaped cradle adjacent an upper end of the respective strut;
- said cradles of said roll receivers facing one another;
- said cradles each having a spaced apart pair of generally straight side portions and an arcuate lower portion connecting said side portions of the respective cradle together;
- said side portions of each cradle being extended at an acute angle to one another;
- a pair of elongate tubular rear extensions each having open front and back ends;
- said front end of a first of said rear extension being inserted into said back end of said rear member of said first wheel assembly to detachably couple said front end of said first rear extension of said back end of said rear member of said first wheel assembly;
- said front end of a second of said rear extension being inserted into said back end of said rear member of said second wheel assembly to detachably couple said front end of said second rear extension of said back end of said rear member of said second wheel assembly;

said rear extensions being extended substantially parallel to one another;

a generally rectangular box having a bottom, a front, a back, a pair of sides, and an open top; and each of said sides of said box having a stub outwardly extending therefrom, said box being positioned between said roll receivers, one of said stubs of said box being rested on said cradle of one roll receiver, the other of said stubs being rested on said cradle of the other roll receiver.

* * * * *